United States Patent
Yi

(10) Patent No.: US 7,564,448 B2
(45) Date of Patent: Jul. 21, 2009

(54) TOUCH SCREEN SYSTEM AND CONTROL METHOD THEREFOR CAPABLE OF SETTING ACTIVE REGIONS

(75) Inventor: Jong-jin Yi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 566 days.

(21) Appl. No.: 10/787,410

(22) Filed: Feb. 27, 2004

(65) Prior Publication Data

US 2005/0017957 A1 Jan. 27, 2005

(30) Foreign Application Priority Data

Jul. 25, 2003 (KR) .................... 10-2003-0051669

(51) Int. Cl.
*G09G 5/00* (2006.01)

(52) U.S. Cl. .................................... 345/173; 178/18.01

(58) Field of Classification Search ................ 345/173, 345/174, 178; 178/18.01, 19.01; 341/5; 349/12; 700/83; 715/781
See application file for complete search history.

(56) References Cited

U.S. PATENT DOCUMENTS

| | | | |
|---|---|---|---|
| 4,952,932 A | 8/1990 | Sugino et al. | |
| 5,682,181 A * | 10/1997 | Nguyen et al. | ............. 345/158 |
| 5,996,080 A * | 11/1999 | Silva et al. | ................. 713/320 |
| 6,262,717 B1 * | 7/2001 | Donohue et al. | ............ 345/173 |
| 6,295,049 B1 | 9/2001 | Minner | |
| 6,727,895 B2 * | 4/2004 | Bottari et al. | ............... 345/174 |
| 6,809,726 B2 * | 10/2004 | Kavanagh | .................... 345/173 |
| 7,057,607 B2 * | 6/2006 | Mayoraz et al. | ............. 345/173 |
| 7,106,307 B2 * | 9/2006 | Cok | ........................... 345/173 |
| 7,176,907 B2 * | 2/2007 | Chao et al. | ................... 345/179 |

FOREIGN PATENT DOCUMENTS

| | | |
|---|---|---|
| DE | 101 44 329 A1 | 3/2003 |
| JP | 6-67830 A | 3/1994 |
| JP | 08-263209 A | 10/1996 |
| JP | 11-126135 A | 5/1999 |
| JP | 2000-349886 A | 12/2000 |
| KR | 1996-0032156 A | 9/1996 |

* cited by examiner

*Primary Examiner*—Abbas I Abdulselam
(74) *Attorney, Agent, or Firm*—Sughrue Mion, PLLC

(57) ABSTRACT

Disclosed is a touch screen system and a control method therefor. The touch screen system includes a display displaying at least one working window; a touch panel outputting a predetermined signal in correspondence with a touch input on the display; a coordinate value calculation unit calculating coordinate values of the touch input based on the signal outputted from the touch panel; a coordinate value storage unit storing coordinate value information indicating active regions for active working windows; a decision unit deciding whether the calculated coordinate values exist in the active regions which the coordinate value information stored in the coordinate value storage unit indicates; and a control unit interrupting a response to the touch input if the calculated coordinate values exist outside the active regions as a result of the decision of the decision unit. Accordingly, the present invention can reduce input errors, to thereby prevent delaying desired processings.

20 Claims, 5 Drawing Sheets

TOUCH SCREEN SYSTEM AND CONTROL METHOD THEREFOR CAPABLE OF SETTING ACTIVE REGIONS

CROSS-REFERENCE TO RELATED APPLICATION

This application claims the benefit of Korean Patent Application No. 2003-51669, filed on Jul. 25, 2003, in the Korean Intellectual Property Office, the disclosure of which is incorporated herein by reference.

BACKGROUND OF THE INVENTION

1. Field of the Invention

Apparatuses and methods consistent with the present invention relate to a touch screen system and a control method therefor, and more particularly, to a touch screen system and a control method therefor capable of setting only certain regions of the entire area of a touch screen as active regions to reduce input errors.

2. Description of the Related Art

The touch screen, which can replace an input device such as a keyboard or a mouse, enables a user to intuitively carry out his or her work in the Graphic User Interface (GUI) environment since the device is mounted on a display device such as a CRT or an LCD and enables the user to touch character or text information displayed on the display device with his or her finger or pen in order for the user's desired job to be processed. Such a touch screen is not only applied to monitors, tablet PCs, Web Pads, automated teller machines (ATMs), and so on, but also, in recent times, applied to a range of diverse devices such as cellular phones, smart phones, PDAs, and the like.

In general, the touch screen has its entire area set as an active region, so a user is likely to make unintentional touch inputs. In this case, such unintentional touch inputs by the user may cause a problem of unexpected operations.

FIG. 1 is a view for explaining unintentional operations of a conventional touch screen system.

As shown in FIG. 1, the active working window among working windows opened to run application programs on the touch screen is a working window 10 on which a stylus pen is located and a user actually wishes to touch to enter an input. However, since the entire area of the touch screen is set as the active region, a touch input can occur on the portion denoted with a reference numeral 20 or 30, which causes a problem since an undesired input is processed.

As above, the conventional touch screen system has a touch panel of which an entire area is set as the active region, so unintentional touch inputs are likely to occur, which easily brings about resultant input errors. The input errors cause a problem of delaying desired operations.

SUMMARY OF THE INVENTION

Accordingly, it is an aspect of the present invention to provide a touch screen system and a control method therefor capable of establishing response regions to respond only to touch inputs on certain regions set as active regions of the entire area of a touch panel in order to reduce input errors on the touch screen.

In order to achieve the above aspect, a touch screen system according to the present invention comprises a display unit for displaying at least one of a plurality of interfaces; a touch panel for outputting a signal in correspondence with a touch input on the display unit; a coordinate value calculation unit for calculating coordinate values of a position corresponding to the touch input based on the signal outputted from the touch panel; a coordinate value storage unit for storing coordinate value information indicating active regions for active interfaces of the plurality of interfaces; a decision unit for deciding whether the calculated coordinate values exist in the active regions which the coordinate value information stored in the coordinate value storage unit indicates; and a control unit for interrupting a response to the touch input if the calculated coordinate values exist outside the active regions as a result of the decision of the decision unit.

In an exemplary embodiment, the coordinate value information stored in the coordinate value storage unit is updated according to an interface to be activated.

Further, the touch screen system further comprises a mode selection unit for setting the active regions, wherein the mode selection unit sets an operation mode of the touch panel to any of a first mode for setting the entire area of the display unit as the active region, a second mode for setting the entire area of the display unit as an inactive region, and a third mode for setting a certain region of the display unit as the active region.

The touch screen system further comprises a mode release key for releasing functions of the second mode and the third mode, wherein, if the operation mode of the touch panel is set to any of the second and third modes and a signal for the mode release key is received, the control unit switches the operation mode of the touch panel to the first mode.

In the meantime, in order to achieve the above aspect, a control method for a touch screen system having a display unit for displaying at least one of a plurality of interfaces and a touch panel for outputting a signal corresponding to a touch input on the display unit, according to the present invention, comprises steps of calculating coordinate values of a position corresponding to the touch input based on the signal inputted from the touch panel; deciding whether the calculated coordinate values exist in the active regions for active interfaces of the plurality of interfaces; and interrupting a response to the touch input if the calculated coordinate values exist outside the active regions as a result of the decision.

In an exemplary embodiment, the control method further comprises a step of setting an operation mode of the touch panel to any of a first mode for setting the entire area of the display unit as the active region, a second mode for setting the entire area of the display unit as an inactive region, and a third mode for setting a certain region of the display unit as the active region.

Further, the control method further comprises steps of inputting a mode release signal for releasing functions of the second mode and the third mode; and operating the touch panel in the first mode if the operation mode is set to any of the second and third modes and the mode release signal is received.

BRIEF DESCRIPTION OF THE DRAWINGS

The invention will be described in detail with reference to the following drawings in which like reference numerals refer to like elements, and wherein.

DETAILED DESCRIPTION OF THE EXEMPLARY EMBODIMENTS

Hereinafter, the present invention will be described in detail with reference to the accompanying drawings.

Figure 1:
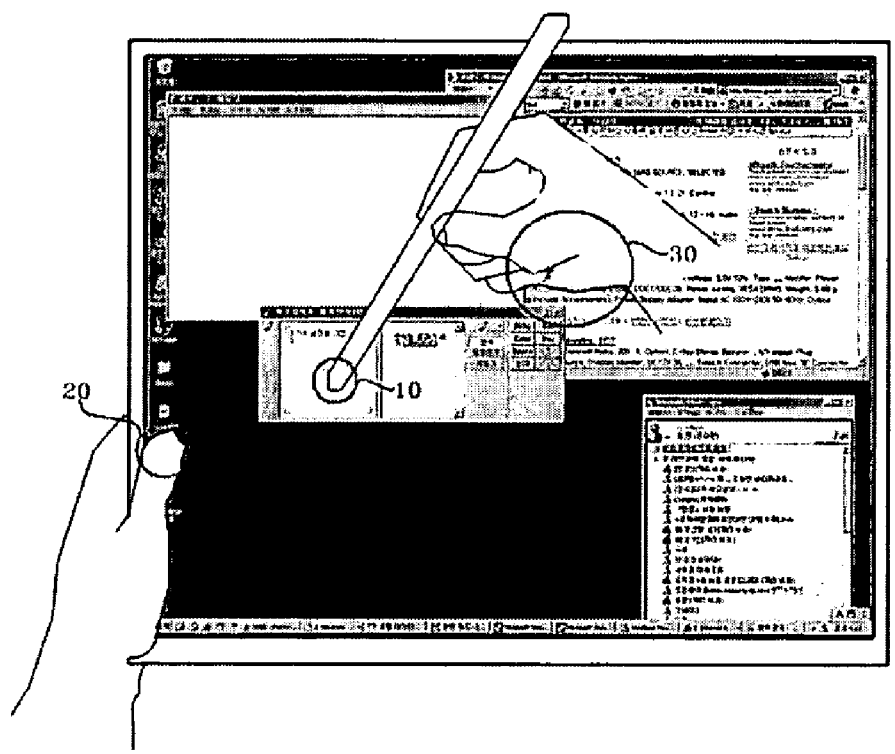
FIG. 1 is a view for explaining unintentional operations of a conventional touch screen system.
Figure 2:
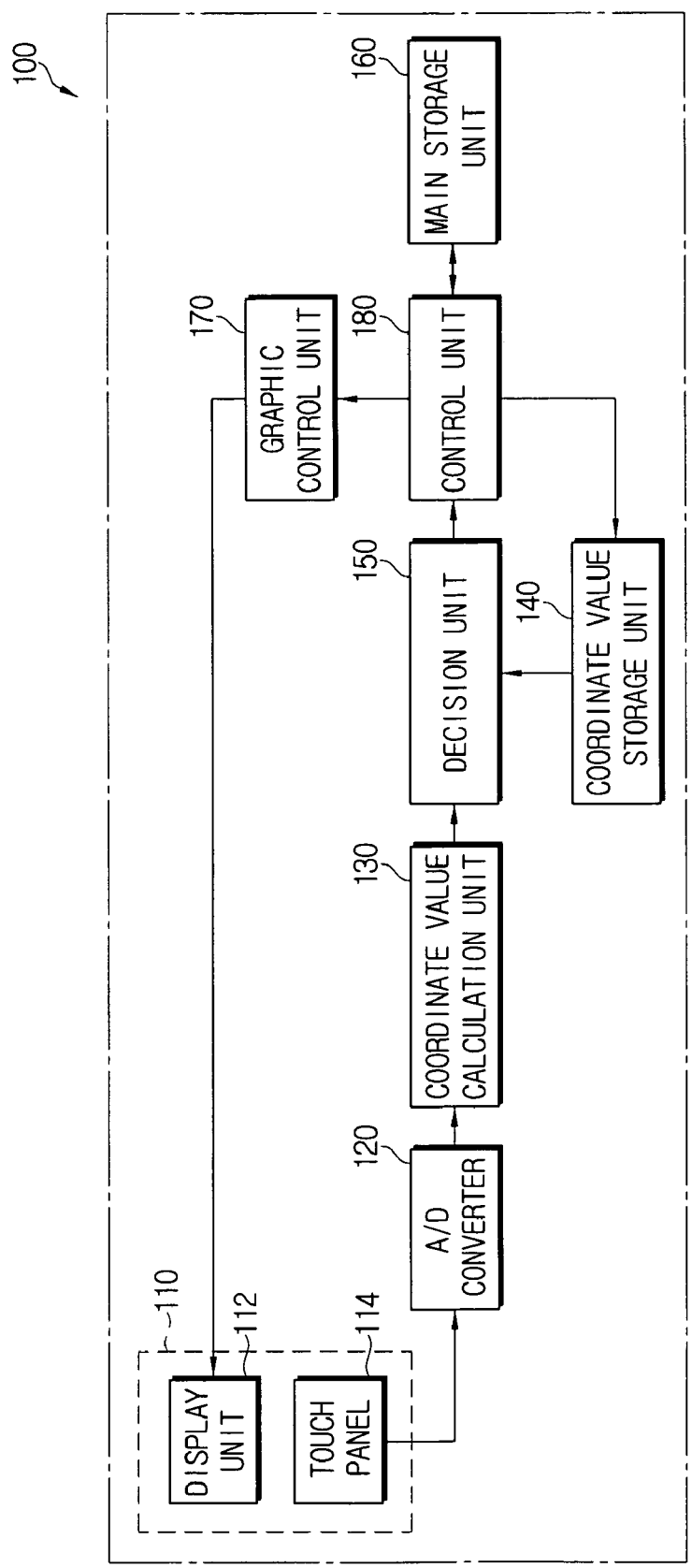
FIG. 2 is a block diagram for showing a touch screen system according to an exemplary embodiment of the present invention.

FIG. 2 is a block diagram for showing a touch screen system equipped with a touch screen according to an exemplary embodiment of the present invention.

Referring to FIG. 2, a touch screen system 100 has a touch screen 110, an A/D converter 120, a coordinate value calculation unit 130, a coordinate value storage unit 140, a decision unit 150, a main storage unit 160, a graphic control unit 170, and a control unit 180.

The touch screen 110 consists of a display unit 112 and a touch panel 114.

The display unit 112 displays interfaces such as working windows, menus, boxes, icons, and bars that the touch screen system 100 supports, and the menus appearing on the display unit 112 are displayed based on the Windows-based operating system. Such a display unit 112 may be a Cathode Ray Tube (CRT), a Liquid Crystal Display (LCD), a Plasma Display Panel (PDP), or the like.

The touch panel 114 has a built-in sensing circuit which can sense a signal in the horizontal axis X and the vertical axis Y, and includes plural layers inclusive of specially treated electrode glass Indium Tin Oxide (ITO glass) and electrode film (ITO film) so that it can sense a signal a user inputs. In other words, the touch panel 114 is a sensor recognizing the coordinates (X,Y) of a position contacted on the touch panel in correspondence with the pressure asserted by a finger, a pen, a stylus, or the like, when the surface of the touch panel 114 is touched, and the touch panel 114 is mounted on the display unit for use and generates a predetermined voltage according to a touch input.

The A/D converter 120 converts into a digital value an electric signal outputted from the touch panel 114 in correspondence with a touch input. The value converted through the A/D converter 120 is applied to the coordinate value calculation unit 130.

The coordinate value calculation unit 130 calculates a coordinate value corresponding to the touch input based on the digital value inputted from the A/D converter 120.

The coordinate value storage unit 140 stores information of coordinate values indicating regions for active interfaces of all the interfaces displayed on the display unit 112. For example, the coordinate value storage unit 140 stores information of coordinate values corresponding to four corners for the active working window regions. In here, the coordinate values stored in the coordinate value storage unit 140 can be seen through an operating system (OS) for driving the working windows. The operating system (OS) has information on sizes of the working windows displayed on the display unit 112, position information corresponding to the working windows are displayed, and so on. Accordingly, the coordinate value information indicating regions for current active working windows can be obtained through the OS, and the coordinate value information stored in the coordinate value storage unit 140 is updated based on working windows to be activated.

The decision unit 150 decides whether coordinate values calculated in the coordinate value calculation unit 130 are values existing in active regions with the coordinate values stored in the coordinate value storage unit 140.

The main storage unit 160 consists of a nonvolatile memory device such as a ROM storing control programs for overall operations of the touch screen system 100, application programs, an OS for driving the application programs, and the like, and a volatile memory device such as a RAM temporarily storing data occurring during the operations of the touch screen system 100. Further, the main storage unit 160 stores information on all coordinate values for the working windows to be displayed through the display unit 112.

The graphic control unit 170 processes characters/images information to be displayed on the display unit 112 according to the controls of the control unit 180.

In an exemplary embodiment, the touch screen system 100 further includes a mode selection unit(not shown) for establishing active regions for the touch panel 114. The modes for establishing the active regions of the touch panel 114 according to the present invention includes a whole active mode for setting the entire area of the touch panel 114 as one active region, an inactive mode for setting the entire area of the touch panel 114 as one inactive region, and a partial active mode for setting only a certain portion of the touch panel 114 as an active region.

The control unit 180 controls the overall operations of the touch screen system 100 according to the control programs stored in the main storage unit 160. The control unit 180 according to the present embodiment controls the operations of the touch screen system 100 according to an operation mode of the touch panel 114 which is selected from the mode selection unit. Descriptions will be made in detail as follows on the operation mode of the touch panel 114 which is selected from the mode selection unit.

First, if an operation mode of the touch panel 114 is set to a whole active mode, the entire area of the touch panel 114 turns into an active region. Accordingly, the control unit 180 performs a process for a job located at coordinate values calculated in the coordinate value calculation unit 130 in correspondence with a touch input.

Next, if an operation mode of the touch panel 114 is set to a partial active mode, only a certain portion of the touch panel 114 turns into an active region. In this case, the control unit 180 decides whether coordinate values calculated by the coordinate value calculation unit 130 in correspondence with a touch input are values existing in the active regions. If the coordinate values calculated by the coordinate value calculation unit 130 is decided to exist in the active regions, the control unit 180 responds to the touch input. On the contrary, if the coordinate values calculated by the coordinate value calculation unit 130 do not exist in the set active regions, the control unit 180 interrupts a response to the touch input.

Figure 3:
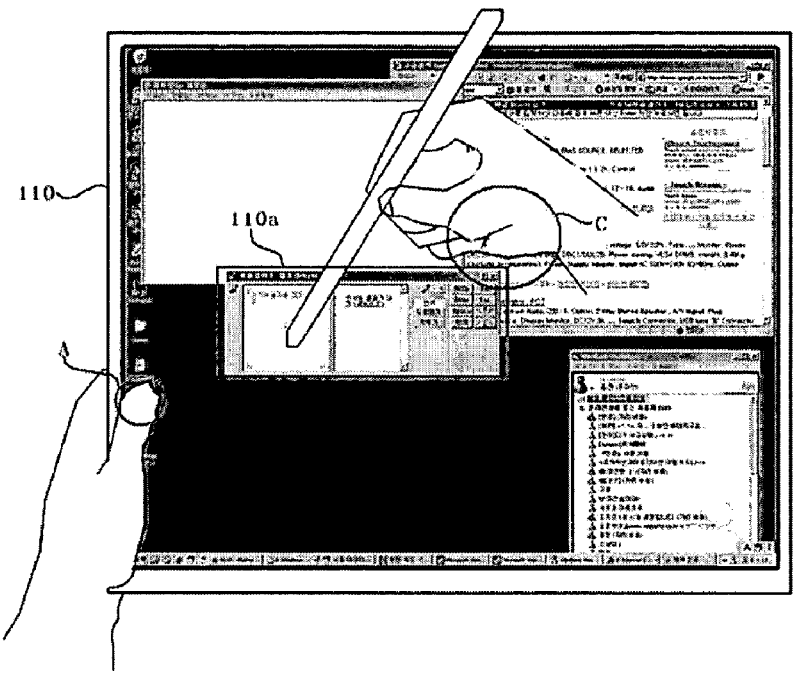
FIG. 3 to FIG. 6 are views for explaining operation modes for the touch panel shown in FIG. 2.

As shown in FIG. 3, the region set as the active region in the partial active mode refers to a working window 110a of the working windows displayed in the display unit 112, which is currently activated. The control unit 180 responds only to a case when the coordinate values calculated by the coordinate value calculation unit 130 exist in the regions indicating the current active working window 110a which is a working window of highest priority. Accordingly, the control unit 180 interrupts a response to the touch inputs on the portions marked reference numerals A and C as shown in FIG. 3, so that input errors can be reduced.

Figure 4:
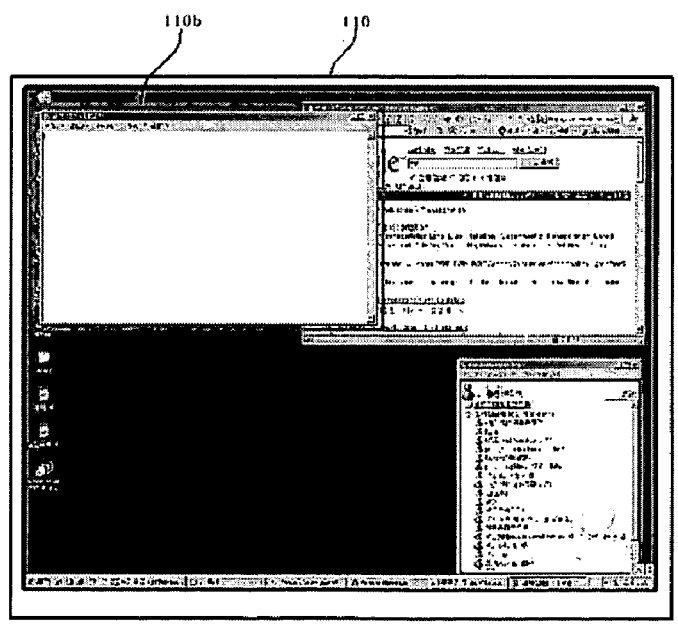

Further, if the current active working window 110a shown in FIG. 3 is minimized or closed with a job done, a region for a next working window 110b turns into an active region, as shown in FIG. 4. At this time, the coordinate values stored in the coordinate value storage unit 140 are updated to coordinate values indicating the region for the new working window 110b.

Figure 5:
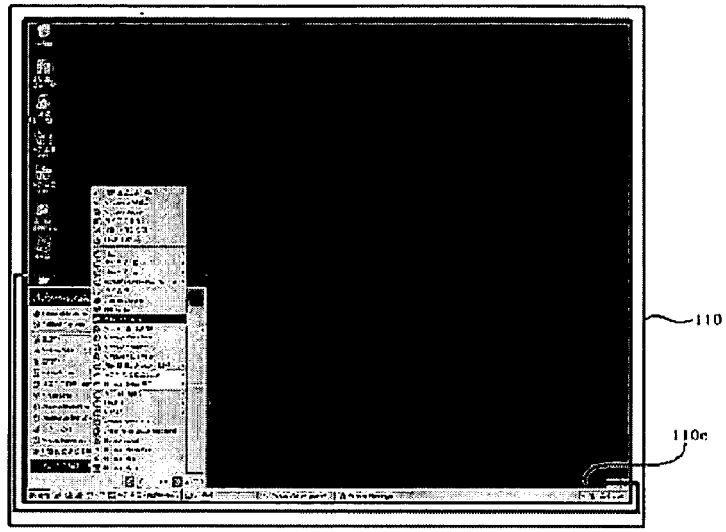

As shown in FIG. 5, in case that any working window is not opened on the touch screen 110 and the start button on the status bar is pressed, the region 110c for the status bar and the start menus turns into an active region. Further, instead of setting only the regions indicating the current active working window 110a and 110b to the active region, the region on which the status bar is displayed can be set to operate as an active region all the time.

In the meantime, if the touch panel 114 is set to the inactive mode, the control unit 180 ignores all touch inputs on the touch panel 114. In this case, the touch screen 110 operates as a display device which shows only display information.

Figure 6:
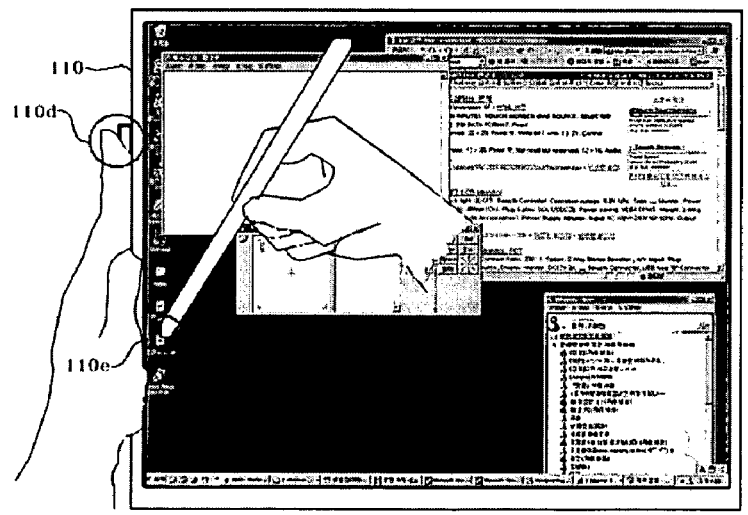

Further, the present invention has a mode release function capable of temporarily releasing the inactive mode or the partial active mode as above. Accordingly, the present invention has a mode release key for releasing the inactive mode and the partial active mode, and the mode release key 110d can be provided on the main body of the touch screen 110 in an external switch fashion as shown in FIG. 6. If a selection signal for the mode release key 110d is received, the control unit 180 temporarily releases the current operation mode of the touch panel 114 to operate the touch panel 114 in the whole active mode. Therefore, a user can select the mode release key 110d to have a different job 110e other than a currently processing job.

Hereinafter, a control method for the touch screen system according to an exemplary embodiment of the present invention will be described with reference to FIG. 7.

Figure 7:
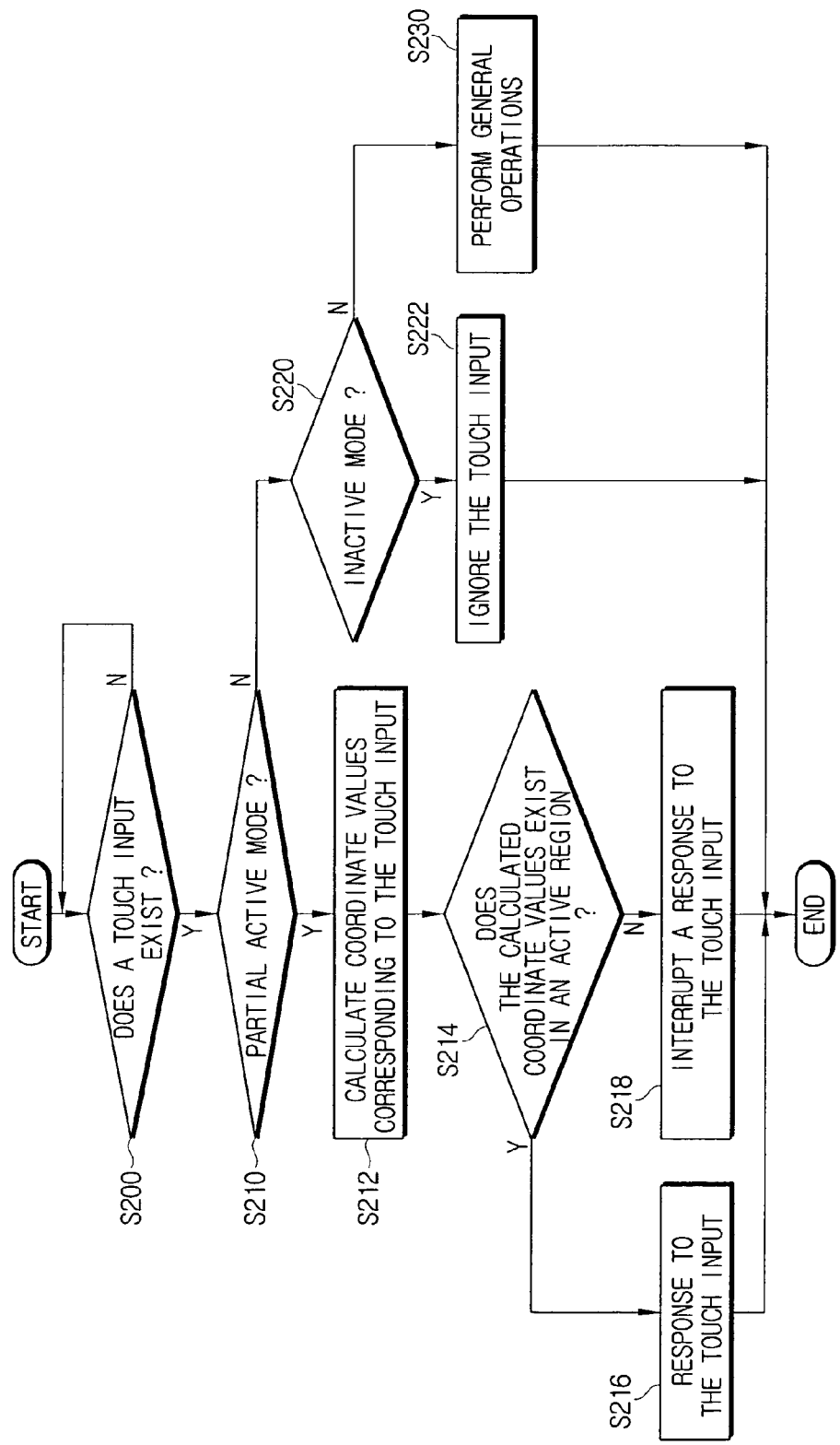
FIG. 7 is a flow chart for explaining a control method for the touch screen system shown in FIG. 2.

FIG. 7 is a flow chart for explaining a control method for the touch screen system shown in FIG. 2.

First, the control unit 180 decides whether a touch input exists (S200). The control unit 180 can decide whether a touch input exists based on whether or not coordinate value information corresponding to the touch input is received from the coordinate value calculation unit 130.

If a touch input is decided to exist in the step S200, the control unit 180 decides an operation mode of the touch panel 114 (S210). If the operation mode of the touch panel 114 is decided to be the partial active mode for setting only a certain portion of the entire area of the touch panel 114 as an active region, the control unit 180 controls the coordinate value calculation unit 130 to calculate coordinate values corresponding to the touch input (S212). The coordinate value calculation unit 130 calculates the coordinate values corresponding to the touch input based on a digital value outputted from the A/D converter 120 according to the controls of the control unit 180.

If the coordinate values corresponding to the touch input are calculated from the coordinate value calculation unit 130, the control unit 180 decides whether the coordinate values calculated from the coordinate value calculation unit 130 exist in an active region indicated by the coordinate values stored in the coordinate value storage unit 140 (S214). If the coordinate values calculated from the coordinate value calculation unit 130 are determined to exist in the active region indicated by the coordinate values stored in the coordinate value storage unit 140, the control unit 180 processes a response to the touch input (S216).

On the contrary, if the coordinate values calculated from the coordinate value calculation unit 130 is determined not to exist in the active region indicated by the coordinate values stored in the coordinate value storage unit 140 as a result of the decision of the step S214, the control unit 180 interrupts a response to the touch input (S218). That is, the control unit 180 ignores the coordinate value information corresponding to the touch input.

In the meantime, if the operation mode of the touch panel 114 is decided not to be the partial active mode in the step S210, the control unit 180 decides whether the operation mode of the touch panel 114 is an inactive mode for setting the entire area of the touch panel 114 into the inactive region (S220). If the operation mode of the touch panel 114 is decided to be the inactive mode in the step S220, the control unit 180 ignores the touch input (S222). In this case, the touch screen 110 operates as a display device for showing display information.

Further, if the operation mode of the touch panel 114 is decided not to be the inactive mode in the step S220, the control unit 180 decides the whole active mode for setting the entire area of the touch panel 114 into the active region, and performs general operations (S230). That is, the control unit 180 performs operations corresponding to the coordinate values calculated from the coordinate value calculation unit 130 in correspondence with the touch input.

As aforementioned, the touch screen system and the control method therefor according to the present invention can selectively respond to touch inputs according to an operation mode of the touch panel, and set only a certain portion of the entire area of the touch panel to an active region to respond only to the touch input existing in the set active region, to thereby reduce input errors. Accordingly, the present invention can prevent job processings from delaying due to the input errors.

Although the exemplary embodiments of the present invention have been described, it will be understood by those skilled in the art that the present invention should not be limited to the described exemplary embodiments, but various changes and modifications can be made within the spirit and scope of the present invention as defined by the appended claims.

What is claimed is:

1. A touch screen system, comprising,
   a display unit for displaying at least one of a plurality of interfaces;
   a touch panel for outputting a signal in correspondence with a touch input on the display unit;
   a coordinate value calculation unit for calculating first coordinate values of the touch input based on the signal outputted from the touch panel;
   a coordinate value storage unit for storing coordinate value information indicating an active region;
   a decision unit for deciding whether the first coordinate values exist in the active region indicated by the coordinate value information stored in the coordinate value storage unit, in a decision;
   a control unit for interrupting a response to the touch input if the first coordinate values exist outside the active region according to the decision of the decision unit; and
   a mode selection unit for setting an active area, and
   wherein the active region comprises a region having coordinate values of four edges of an active interface of the plurality of the interfaces, and a region having coordinate values of four edges of a status bar,
   wherein the mode selection unit sets an operation mode of the touch panel to one of a first mode for setting an entire area of the display unit as the active area, a second mode for setting the entire area of the display unit to an inactive area, and a third mode for setting a certain region of the display unit to the active area.

2. The touch screen system as claimed in claim 1, wherein the coordinate value information stored in the coordinate value storage unit is updated according to a first interface to be activated.

3. The touch screen system as claimed in claim 1, further comprising a mode release key for releasing the second mode and the third mode, wherein, if the operation mode of the touch panel is set to one of the second and third modes and a signal for the mode release key is received, the control unit switches the operation mode of the touch panel to the first mode.

4. The touch screen system as claimed in claim 1, wherein one interface of the plurality of interfaces is one of a box, a window, an icon, and a bar.

5. The touch screen system as claimed in claim 1, wherein the signal is a predetermined sensing signal.

6. The touch screen system as claimed in claim 1, wherein the first coordinate values indicate a position of the touch input.

7. The touch screen system as claimed in claim 1, wherein the third mode is for setting only the certain region of the display unit to the active area, wherein the certain region is less than the entire area of the display.

8. The touch screen system as claimed in claim 1, wherein the control unit responds to the touch input only if the first coordinate values exist inside the active region according to the decision of the decision unit.

9. The touch screen system as claimed in claim 1, wherein a region not indicated as an active region according to coordinate value information stored in the coordinate value storage unit is an inactive region, and wherein the control unit does not respond to the touch input if the first coordinate values exist inside the inactive region according to the decision of the decision unit.

10. A control method for a touch screen system having a display unit for displaying at least one of a plurality of interfaces and a touch panel for outputting a signal corresponding to a touch input on the display unit, comprising steps of:

calculating first coordinate values of a position corresponding to the touch input based on the signal outputted from the touch panel;

deciding whether the first coordinate values exist in an active region of an active interface of the plurality of the interfaces; and interrupting a response to the touch input if the first coordinate values exist outside the active regions as a result of the decision, further comprising a step of setting an operation mode of the touch panel to one of a first mode for setting an entire area of the display unit as an active area, a second mode for setting the entire area of the display unit as an inactive area, and a third mode for setting a certain region of the display unit as the active area.

11. The control method as claimed in claim 10, further comprising steps of:

receiving a mode release signal for releasing the second mode and the third mode; and operating the touch panel in the first mode if the operation mode is set to one of the second and third modes and the mode release signal is received.

12. The control method as claimed in claim 10, wherein the one interface of the plurality of interfaces is one of a box, a window, an icon, and a bar.

13. The control method as claimed in claim 10, wherein the signal is a predetermined sensing signal.

14. The control method as claimed in claim 10, wherein the first coordinate values indicate a position of the touch input.

15. The control method as claimed in claim 10, wherein the interrupting the response comprises ignoring the touch input.

16. The control method as claimed in claim 10, wherein the third mode is for setting only the certain region of the display unit to the active area, wherein the certain region is less than the entire area of the display.

17. The control method as claimed in claim 10, wherein the plurality of interfaces comprises a plurality of windows.

18. The control method as claimed in claim 10, wherein the active region further comprises a region having coordinate values of four edges of an active interface of the plurality of the interfaces.

19. A touch screen system, comprising, a display unit for displaying at least one of a plurality of interfaces;

a touch panel for outputting a signal in correspondence with a touch input on the display unit;

a coordinate value calculation unit for calculating first coordinate values of the touch input based on the signal outputted from the touch panel;

a coordinate value storage unit for storing coordinate value information indicating an active region of an active interface of the plurality of the interfaces;

a decision unit for deciding whether the first coordinate values exist in the active region indicated by the coordinate value information stored in the coordinate value storage unit, in a decision;

a control unit for interrupting a response to the touch input if the first coordinate values exist outside the active region according to the decision of the decision unit; and a mode selection unit for setting an active area to one of a plurality of modes, wherein the plurality of modes includes at least two of a first mode, a second mode and a third mode, the first mode sets an entire area of the display unit as the active area, the second mode sets the entire area of the display unit to an inactive area and the third mode sets a certain region of the display unit to the active area.

20. A control method for a touch screen system having a display unit for displaying at least one of a plurality of interfaces and a touch panel for outputting a signal corresponding to a touch input on the display unit, comprising steps of:

calculating first coordinate values of a position corresponding to the touch input based on the signal outputted from the touch panel;

deciding whether the first coordinate values exist in an active region of an active interface of the plurality of the interfaces;

interrupting a response to the touch input if the first coordinate values exist outside the active regions as a result of the decision; and setting an operation mode of the touch panel to one a plurality of modes, wherein the plurality of modes includes at least two of a first mode, a second mode and a third mode, the first mode sets an entire area of the display unit as the active area, the second mode sets the entire area of the display unit to an inactive area and the third mode sets a certain region of the display unit to the active area.

* * * * *